United States Patent [19]

McNeill

[11] 4,199,720

[45] Apr. 22, 1980

[54] METHOD FOR INVESTIGATING THE CONDUCTIVITY OF LAYERED TERRAIN

[76] Inventor: J. Duncan McNeill, 284 Mill Rd., Apt. PH8, Etobicoke, Ontario, Canada

[21] Appl. No.: 928,846

[22] Filed: Jul. 27, 1978

[51] Int. Cl.² .............................................. G01V 3/10
[52] U.S. Cl. .................................................... 324/334
[58] Field of Search ..................................... 324/6, 3, 4

[56] References Cited

U.S. PATENT DOCUMENTS 4,070,612   1/1978   McNeill et al. ........................... 324/6

Primary Examiner—Gerard R. Strecker

Attorney, Agent, or Firm—Ridout & Maybee

[57] ABSTRACT

The conductivity of horizontally layered terrain is investigated by using spaced transmitter and receiver coils above the terrain, the transmitter coil frequency being low enough relative to the coil separation and the terrain conductivity so that the quadrature component of the received signal is essentially the sum of noninteractive components attributable to the separate layers and directly proportional to the conductivity of those layers, a plurality of measurements being made using different measurement parameters so that unknown thickness and/or conductivity parameters of the layers may be ascertained.

7 Claims, No Drawings

METHOD FOR INVESTIGATING THE CONDUCTIVITY OF LAYERED TERRAIN

FIELD OF THE INVENTION

This invention relates to a method of investigating variations of conductivity with depth in a multi-layered earth.

BACKGROUND OF THE INVENTION

In our U.S. Pat. No. 4,070,612, issued Jan. 24, 1978, the disclosure of which patent is incorporated herein by reference, we disclose and claim a method of measuring terrain conductivity comprising generating an alternating current having a frequency F hertz, and applying the current to a transmitter for transmission to the terrain, receiving signals from the terrain by means of a receiver coil spaced from the transmitter coil above the terrain by a distance D of not more than about $50/\sqrt{FG}$ where G is the highest terrain conductivity to be measured in siemens/meter, isolating the quadrature component of the received signal, and using the amplitude of said signal as a linear indicator of terrain conductivity. Apparatus for carrying out this method is also described, illustrated and claimed.

SUMMARY OF THE INVENTION

We have now found that plural conductivity measurements made by the above method may be employed to obtain useful additional data concerning the structure of terrain having superimposed layers of different conductivity, provided that the requirement that D does not exceed about $50/\sqrt{FG}$ is met for each of the layers.

Considering the case when the transmitter dipole is vertical, the induced current flow in the earth is in a series of circles coaxial with the transmitter dipole moment. Thus in the event that the earth is not of uniform resistivity but is horizontally stratified with each of the layers having a different resistivity symmetry still requires that the current flow be a series of horizontal circles and thus that no current flow is required to cross an interface between layers of different resistivity.

In the apparatus and method disclosed in U.S. Pat. No. 4,070,612, the spacing between the transmitter and receiver coils is always maintained at a small fraction of a skin depth under the conditions of operation, and in these circumstances, the induced eddy current flow is almost entirely in quadrature phase with respect to the current in the transmitter coil. The reason for this is that the frequency of operation is sufficiently low under the conditions of the invention that the effective inductive reactance of any current loop in the ground is much less than the effective resistance of that loop, so that the phase of the current flow in any loop lags the primary magnetic flux density by substantially 90 degrees. Since the secondary magnetic field from any one of these current loops is in phase with the current flow in that current loop, substantially the entire secondary magnetic field is also in quadrature phase with the primary magnetic field. There is however another potential contribution to the effective resistance and inductive reactance of each current loop, and this arises from magnetic coupling with each and every other current loop in the ground. Again since the frequency of operation is sufficiently low that the inductive reactance of any loop is much less than the resistance of that loop, the effective resistance and inductive reactance of a given loop can be shown by simple circuit theory to be independent of the presence of all of the other current loops. Effectively, the loops are sufficiently loosely coupled that the current flow in any given loop is determined essentially by the primary magnetic field and is little influenced by the field from all of the other current loops. The current in each current loop is thus a linear function of ground conductivity, and can therefore be readily calculated. Moreover, it also follows that an increase or reduction in the strength of the current loops lying in a particular layer, due to increase or reduction of the conductivity of that layers, will not affect the current flow in the loops in the remaining layers, since the current that flows in any one loop remains independent of the current that flows in any other loop.

The strength of the alternating magnetic field that exists in any region within the earth is thus almost exactly that from the transmitter, and by making this assumption it is a simple matter to calculate the relative magnitude of the current flow induced in any loop in the ground, and from this to calculate the vertical secondary magnetic field strength due to this current on the surface of the earth at a distance from the transmitter corresponding to the spacing between the transmitter and receiver coils. This is of course the contribution to the vertical magnetic field that will be seen by a vertical dipole receiver coil due to the current in that loop. It is then possible to compute the contributions to this vertical magnetic field from all the current loops in the ground located at any particular depth and having a radius varying from zero to infinity. This ascertains the vertical magnetic field produced from the entire current flowing in a thin layer located at a particular depth. If the magnitude of this field for all possible depths is computed, the results obtained indicate the relative influence of the current flow at various depths on the secondary magnetic field at the receiver coil. This data can be plotted graphically to provide a curve showing the relative importance of the current flow at each depth as a fraction of the spacing between the receiver and transmitter coils. It is found that, for the case where both the transmitter and the receiver dipoles are vertical, the relative contribution increases rapidly from zero at zero depth to a maximum at a depth approximately equal to one half the spacing between the coils, the relative contribution thereafter dropping off and asymptotically approaching zero as the depth increases. However, the ground at a depth of twice the spacing between the coils still produces a significant contribution to the received magnetic field. By integrating the relative contributions of the layers in a particular stratum, which may be achieved by measuring the relative area beneath the associated portion of the curve mentioned above, the contribution of that stratum can be ascertained.

By relating the resistivity readings obtained using the method and apparatus of the invention to the areas beneath different portions of the above curve, and to known data relating to the terrain being investigated, it is possible to obtain further information relating to the thickness and resistivity of different layers of the terrain.

Although the case in which the magnetic dipole of the transmitter is vertical has been considered, similar considerations apply when it is horizontal, and the method of the invention is in fact applicable for any orientation of transmitter and receiver dipoles with respect to each other and/or the earth as long as the receiver dipole orientation is such as to couple to some of the magnetic field arising from the currents induced in the earth. When the terrain whose conductivity is being measured comprises more than one layer, the method includes the step of interpreting the terrain conductivity reading obtained on the basis that the contribution to the conductivity reading due to any layer is the product of the conductivity of that layer and the reading which would theoretically (as predicted by the area beneath the relevant portion of the curve referred to above) be obtained with the same values of F (the operating frequency) and D (the spacing between the transmitter and receiver coils) from that layer alone where it an isolated layer of unit conductivity. By repeating the technique a plurality of times using different values of D, additional data may be obtained enabling the thickness and/or depth of layers to be determined by the solution of simultaneous equations formulated from the data obtained.

DESCRIPTION OF THE PREFERRED EMBODIMENTS

In the method and device for measuring terrain conductivity described in U.S. Pat. No. 4,070,612 it is described how for small values of induction number (defined at the ratio of the intercoil spacing to the skin depth) below a specified limit defined in terms of the coil spacing, maximum terrain conductivity and transmitter frequency, the quadrature phase response of the output was essentially linearly proportional to the ground conductivity. The reason for this is that at small values of induction number the frequency, by definition, is low enough so that for any current loop in the ground, the magnetic field of which is sensed by the receiver coil, the self inductance or the mutual inductance between that current loop and any other current loop are both so small that the associated inductive reactances are much less than the resistance of the loop and the current flow within the loop is therefore determined by the local resistivity or conductivity of the ground. The absence of magnetic interaction of current flow is shared with conventional low frequency AC or DC resistivity techniques. However the use of magnetically induced currents in the ground rather than the electrode injected currents of conventional resistivity techniques yields another advantage which is that all current flows within a homogenous or horizontally layered earth are horizontal, i.e. that the current is not required to cross any interfaces between layers of different conductivities. Thus at low induction numbers and for a horizontally layered earth the current flowing in any layer is completely independent of the current flowing in any other layer.

There are currently two conventional geophysical approaches to the determination of the conductivity (resistivity) of the ground (a) conventional resistivity using low frequency AC or DC and electrodes and (b) inductive techniques employing moderate to high values of induction number in order to achieve readily measured signals. For the conventional resistivity technique magnetic interaction of the current flow is not usually a problem but the direction of current flow in the ground is complex with current constantly crossing interfaces at arbitrary angles. Calculation of the response over a multilayered earth is involved and expensive. This becomes particularly important when one is trying to generate a multilayered earth modeled to fit a given experimental curve for an expanding array.

In the case of induction techniques and moderate induction numbers the current flow is horizontal but the magnetic interaction of the various current loops again requires involved and expensive calculations for the response to a multi-layered earth when either the frequency or the intercoil spacing is varied so as to vary the depth of penetration. We have found that utilization of inductive techniques at low induction numbers, in accordance with U.S. Pat. No. 4,070,612, by virtue of the independence of the current flow in each layer, renders possible simple calculation of the response over a multi-layered earth. To calculate what the instrument would read, it is simply necessary to add linearly the contribution from each layer weighted by its conductivity and its distance below the surface. In the event that the conductivity of any layer is changed, it is simply necessary to change the contribution to the final reading from that layer by an amount proportional to the conductivity change. It is possible in a manner completely analogous to that of the conventional resistivity array to vary the depth of exploration by varying the intercoil spacing but now it is a straight forward matter for the geophysicist to postulate a layered earth model and calculate with only pencil and paper or a small inexpensive hand calculator what the instrument will read as the coil spacing is varied. Conversely, automatic curve matching a suitable theoretical model against field data on a computer becomes a less expensive procedure.

The manner in which the calculations are done can be illustrated as follows. Assume that the transmitter dipole moment is vertical on the earth's surface. Current flow in the earth is horizontal and thus in the case of horizontal layering no current crosses an interface. Furthermore as mentioned above, at low frequencies such that the induction number is of the order of 1/10 or less, there is no mutual interaction between current loops and therefore the current flow in each layer is independent of the current flow in all other layers. A function R(z), which defines what fraction of the horizontal or vertical magnetic field component at the receiver is caused by all of the ground current flowing beneath a depth z is simply the integral with respect to depth of the contributions of the various layers from depth z to infinity. For example, it is possible to show that for the case of a vertical transmitter dipole and a vertical receiver dipole the function R(z) is given by:

$$R(z) = \frac{1}{\sqrt{\left(\frac{2z}{D}\right)^2 + 1}} \qquad (1)$$

where D is the intercoil spacing.

Substitution of figures into this expression shows that one hundred percent of the response of the equipment comes from below zero depth, approximately seventy percent of the response comes from the ground below one half the intercoil spacing, approximately forty-five percent of the response comes from the ground below one intercoil spacing, approximately sixteen percent from below three intercoil spacings, etc.

It is this function which allows weighting the contribution from any given layer in a multi-layered situation. For example, it is self evident that, knowing this function, the response from a two layer ground can be calculated to be as follows:

$$\sigma_a/\sigma_1 = 1 - R(z) + k_2 R(z) \quad (2)$$

Where
$k_2 = \sigma_2/\sigma_1$
z is the depth to the interface
$\sigma_1$ is conductivity of upper layer
$\sigma_2$ is conductivity of the substrate
$\sigma_a$ is the "apparent conductivity" that the instrument would actually read.

Thus knowing the conductivity of each layer and the depth to the interface it is a simple matter to calculate $R(z)$ from equation (1) and $\sigma_a$ from equation (2). In the case of ground having many layers of different conductivities the apparent conductivity is given by the simple extension of equation (2):

$$\frac{\sigma_a}{\sigma_1} = 1 - R(z_1) \text{ contribution from 1st layer} \quad (3)$$
$$+ k_2 [R(z_1) - R(z_2)] \text{ contribution from 2nd layer}$$
$$+ k_3 [R(z_2) - R(z_3)] \text{ contribution from 3rd layer}$$
$$\vdots$$
$$+ k_n R(z_{n-1}) \text{ contribution from substrate}$$

where $k_n = \frac{\sigma_n}{\sigma_1}$ = relative conductivity of nth layer
$z_n$ = distance from surface to bottom of nth layer From this equation it may be seen that a change in conductivity of any layer is very simply accounted for.

It is also possible to derive different expressions for equation (1) for any other combination of coil orientations.

The intercoil spacing D appears in equation (1) and thus also in equation (2) and (3); that is to say all layer depths are described in terms of the intercoil spacing, and therefore by changing the intercoil spacing we can effectively probe to greater and greater depths so long as the condition is always maintained that we were still operating at small values of induction number.

Yet another possibility presents itself. In the case of an instrument designed according to these principles and which is one-man portable so that the intercoil spacing is small, generally less than a few meters, it is possible to raise the instrument from the ground, continuously noting the meter reading as a function of height, in order to determine how the conductivity is varying with depth in the ground. The equations given above still apply but now $\sigma_1$ is equal to zero, $z_1$ is the height of the instrument above the surface, $z_2$ is the distance from the instrument to the bottom of the first layer, etc. It is a simple matter to decide upon a model using the multi-layered earth approach and to calculate using these equations how the instrumental output should vary as a function of the height above the ground and to compare this with the actual measured values, or to invert the data to determine the actual layering.

The utility of the method of the invention may be illustrated by reference to some typical applications.

Assume for example that it is wished to investigate an area of terrain in which it is known that a layer of gravel of known conductivity overlies clay, also of known conductivity. Under these circumstances, it is possible to calculate as discussed above, the conductivity reading that will be obtained from a conductivity meter in accordance with U.S. Pat. No. 4,070,612 as the depth of the interface between the gravel and the clay is varied.

The spacing between the transmitter and receiver coils being known, the depth of the interface between the layers may be expressed in terms of that spacing, and using equations (1) and (2), a further curve can be prepared relating the apparent conductivity reading to the depth of the interface.

In another case, an upper layer of known conductivity and thickness might be overlying a layer of unknown conductivity. The contribution of the upper layer to the output reading will be readily calculable, and may be deducted from the conductivity reading obtained, the conductivity of the lower layer then being readily calculable from the figure obtained. Again, a curve may be prepared relating the reading obtained to the conductivity of the lower layer.

In the foregoing examples, only one unknown remained to be ascertained. By taking conductivity readings at more than one coil spacing, more than one unknown may be ascertained, using simultaneous equations. Moreover, the method is not limited to ground having two layers only. For example, if the ground has three layers of known conductivity but unknown thickness, the two unknowns will be the interface depths and these may be ascertained by making conductivity measurements with two different coil spacings and solving. Numerous other possible permutations of known and unknown properties of a layered earth may be investigated in a similar manner, on the basis that the contribution to the output reading of a layer of particular thickness at a particular depth, expressed in terms of the coil spacing, will be the product of the conductivity of the layer and a factor which is a constant for a layer of that thickness and depth.

Instead of varying the coil spacing, an alternative technique may conveniently be employed with the apparatus shown in FIG. 1 of U.S. Pat. No. 4,070,612 which has a fixed coil spacing. This involves lifting the instrument to different heights above the ground, the air between the instrument and the ground forming a layer of zero conductivity and making no contribution to the instrument output. However, the relative contribution of different layers of the ground to the output reading will vary as the thickness of the air layer varies, thus enabling unknown layer thicknesses or conductivities to be calculated. This is particularly easy when a high conductivity layer overlies a low conductivity layer and the unknown is the thickness or conductivity of the high conductivity layer. Even without calculation, the variation in the meter reading as the instrument is lifted will give a trained operator a useful indication of the general pattern of conductivity variation with depth.

What I claim is:

1. In a method of investigating terrain conductivity comprising generating an alternating current having a frequency F hertz, and applying the current to a transmitter coil for transmission to the terrain, receiving signals from the terrain by means of a receiver coil spaced from the transmitter coil above the terrain by a distance D of not more than about $50/\sqrt{FG}$ where G is the highest terrain conductivity to be measured in siemens/meter, isolating the quadrature component of the received signal, and using the amplitude of said signal as a linear indicator of terrain conductivity; the further step when the terrain is layered of altering the relative locations of the coils and terrain between repeated readings at the same site so as to change the relative contributions to the terrain conductivity reading of different layers of the terrain, the coil separation D being maintained at not more than about $50/\sqrt{FG}$ for each of the layers, whereby the contribution to the conductivity reading due to any layer is the product of the conductivity of that layer and the reading which would theoretically be obtained with the same values of F and D from that layer alone were it an isolated layer of unit conductivity.

2. A method according to claim 1, wherein the conductivity is investigated a plurality of times using different values of D.

3. A method according to claim 1, wherein the conductivity is investigated a plurality of times with the transmitter and receiver coils conjointly raised to different heights above the ground, so as to introduce between the instrument and the ground air layers having different known thicknesses and zero conductivity.

4. A method of investigating the conductivity of layered terrain having more than one substantially horizontal layer, comprising placing spaced transmitter and receiver coils over the terrain to be investigated, supplying an alternating current to the transmitter coil so as to set up horizontal current loops in the terrain, selecting the horizontal spacing of the coils and the frequency of the current so that for any current loop in the terrain whose magnetic field is significant at the receiver coil, the self inductance of the loop mutual inductance between that loop and any other current loop are both so small that the associated inductive reactances are negligible compared to the resistance of the loop and the contributions of each layer of the terrain to the secondary signal are independent, measuring the quadrature component of the secondary signal induced in the receiver coil by the fields of said current loops, repeating the measurement after altering one of the relative location of the coils, the spacing of the coils and the elevation of the coils above the terrain so as to provide a predetermined change in the relative contributions of the layers at different depths, and comparing the measurements so as to quantify at least one unknown parameter of the layering.

5. A method according to claim 4, wherein the unknown parameter is the thickness of a layer of the terrain.

6. A method according to claim 4, wherein the unknown parameter is the conductivity of a layer of the terrain.

7. A method according to claim 4, wherein the unknown parameter is the variation in thickness of a layer of the terrain.

* * * * *